United States Patent [19]

Saito

[11] Patent Number: 5,541,667
[45] Date of Patent: Jul. 30, 1996

[54] METHOD AND APPARATUS FOR LOST BLOCK SUBSTITUTION IN A MOVING PICTURE RECEIVING SYSTEM

[75] Inventor: Taku Saito, Kanagawa, Japan

[73] Assignee: Mitsubishi Denki Kabushiki Kaisha, Tokyo, Japan

[21] Appl. No.: 998,414

[22] Filed: Dec. 29, 1992

[30] Foreign Application Priority Data

Feb. 28, 1992 [JP] Japan ................................. 4-042791

[51] Int. Cl.$^6$ ...................................................... H04N 7/12
[52] U.S. Cl. ............................................ 348/616; 348/466
[58] Field of Search ............................... 358/160, 133, 358/141, 136; 371/31; 348/616, 607, 466; H04N 7/12

[56] References Cited

U.S. PATENT DOCUMENTS

| | | | |
|---|---|---|---|
| 4,497,055 | 1/1985 | Hoshino et al. | 371/31 |
| 4,704,628 | 11/1987 | Chen et al. | 358/136 |
| 4,876,595 | 10/1989 | Veldhuis | 358/136 |
| 4,989,088 | 1/1991 | Wada et al. | 358/136 X |
| 5,122,876 | 6/1992 | Aoki | 358/133 |
| 5,150,210 | 9/1992 | Hoshi et al. | 358/135 |
| 5,247,363 | 9/1993 | Sun et al. | 348/616 |

FOREIGN PATENT DOCUMENTS

| | | | |
|---|---|---|---|
| 0415699 | 3/1991 | European Pat. Off. | H04N 5/94 |
| 2172388 | 7/1990 | Japan | H04N 7/13 |
| 2172385 | 7/1990 | Japan | H04N 5/92 |

OTHER PUBLICATIONS

"An Experimental HDTV Codec for ATM Networks", Kiyoshi Sakai, et al., Third International Workshop for Packet Video (Visicom '90), pp. 1–6, Mar. 22–23, 1990, Morristown, NJ.

Primary Examiner—Victor R. Kostak
Assistant Examiner—John W. Miller
Attorney, Agent, or Firm—Wolf, Greenfield & Sacks, P.C.

[57] ABSTRACT

A moving picture receiving method for receiving a moving picture by block unit includes steps of detecting a lost block which can not be reproduced in the receiving image signal, calculating an average value of blocks adjacent to the lost block which can not be reproduced, adaptively substituting the lost block by an average value of the block adjacent to the lost block or a block at the same location corresponding to the preceding frame in case that the block is lost in the receiving signal.

12 Claims, 3 Drawing Sheets

| LARGE | LARGE | LARGE |
|-------|-------|-------|
| LARGE | LOST BLOCK | LARGE |
| SMALL | LARGE | LARGE |

FIG. 2A

| SMALL | LARGE | LARGE |
|-------|-------|-------|
| SMALL | LOST BLOCK | SMALL |
| SMALL | SMALL | SMALL |

FIG. 2B

METHOD AND APPARATUS FOR LOST BLOCK SUBSTITUTION IN A MOVING PICTURE RECEIVING SYSTEM

BACKGROUND OF THE INVENTION

1. Field of the Invention

The invention relates to a moving picture receiving apparatus which compensates image data being lost through the television signal transmission path.

2. Description of the Prior Art

FIG. 3 shows a conventional moving picture receiving apparatus, and is a block diagram of a principle construction of the image data transmission system disclosed in the Japanese patent publication No. 3- 124183, the title of which is "image decoding apparatus for compensating abandoned cells". In the figure, 8 is a block disassembling portion, 9 is a block assembling portion, 10 is a coding portion, 11 is a transmission path, 12 is a decoding portion, 13 is a comparison result information transmitting means, 14 is an abandoned cell compensation means.

The operation of the above prior art is explained here. In FIG. 3, an input image signal 200 is assembled into blocks in the block assembling portion 9, and the blocked signals are processed in succeeding circuits. The blocked image data 201 are coded into a coded image signal in the coding portion 10. The blocked image data are also inputted into the comparison result information transmitting means 13. The comparison result information transmitting means 13 compares the blocked image data 201 with a block at the same position of the preceding frame, and produces a comparison result information 202 which indicates "larger" or "smaller" than the predetermined threshold value. The coded image data 203 and the comparison result information 202 are transmitted to the decoding portion 12 via the transmission path 11. The coded image data 203 are decoded into image data 204 for every block in the decoding portion 12.

The image data 204 for every block am generally converted into a linescan data, that is, output image data 205 at the block disassembling portion 8.

In case that errors occur through the transmission path 11 and are included in the coded image data 203, or the coded image data 203 can not be regenerated by data abandonment, the coded image data 203 are compensated by the comparison result information 202.

The method for compensating the coded image data 203 is explained below. When the comparison result information 202 indicates "smaller" than the threshold level, the coded image data 203 is compensated by the DC (direct current) component of the block corresponding to the block of the preceding frame. When the comparison result information 202 indicates "larger" than the threshold level, the coded image data 203 is compensated by the DC component of the blocks adjacent to the abandoned block of the same frame. This compensation can reduce influences of the image quality when the data are abandoned in the transmission path 11.

Since the conventional moving picture receiving apparatus is constructed as being described above, if the image data includes the lost or abandoned data, the DC component errors are reduced by compensating lost data using the comparison result information. Therefore, the visual degradation of the picture can be decreased.

But, it is necessary to provide an additional apparatus for transmitting the comparison result information from the transmitting apparatus to the receiver. Therefore, there occurs a problem that the transmitting efficiency decreases in the total system.

It is an object of the present invention to provide a moving picture receiving apparatus which decreases image degradation of the picture including the lost picture block which can not be reproduced, and gives less physical disorder of the picture, without providing any additional apparatus to the transmitting apparatus and without transmitting additional information from the transmission apparatus to the receiving apparatus.

SUMMARY OF THE INVENTION

According to one aspect of the invention, a moving picture receiving method for receiving a moving picture by block unit, includes steps of detecting a lost block which can not be reproduced in the receiving image signal, calculating an average value of blocks adjacent to the lost block which can not be reproduced, adaptively substituting the lost block by an average value of the block adjacent to the lost block or a block at the same location corresponding to the preceding frame in case that the block is lost in the receiving signal.

According to another aspect of the present invention, a moving picture receiving apparatus for receiving a moving picture by block unit includes a lost block detection means which detects a lost block in the receiving signal, a block average value calculation portion which calculates a block average value, a substitution control means for detecting a change of an average value of the block adjacent to the lost block by obtaining subtraction between an average value of a block adjacent to the lost block and an average value of the adjacent block at the same location corresponding to the preceding frame, and outputs a control signal, a frame memory means for providing an image block corresponding to the preceding frame, an adjacent block average value calculation means for calculating an adjacent block average value, a selector means for selecting either an output average value of the frame memory means or an output block of the adjacent block average value calculation portion in response to the output control signal of the substitution control means.

BRIEF DESCRIPTION OF THE DRAWINGS

FIGS. 2A and 2B show substitution patterns of the substitution control portion 2.

DETAILED DESCRIPTION OF THE PREFERRED EMBODIMENTS

Figure 1:
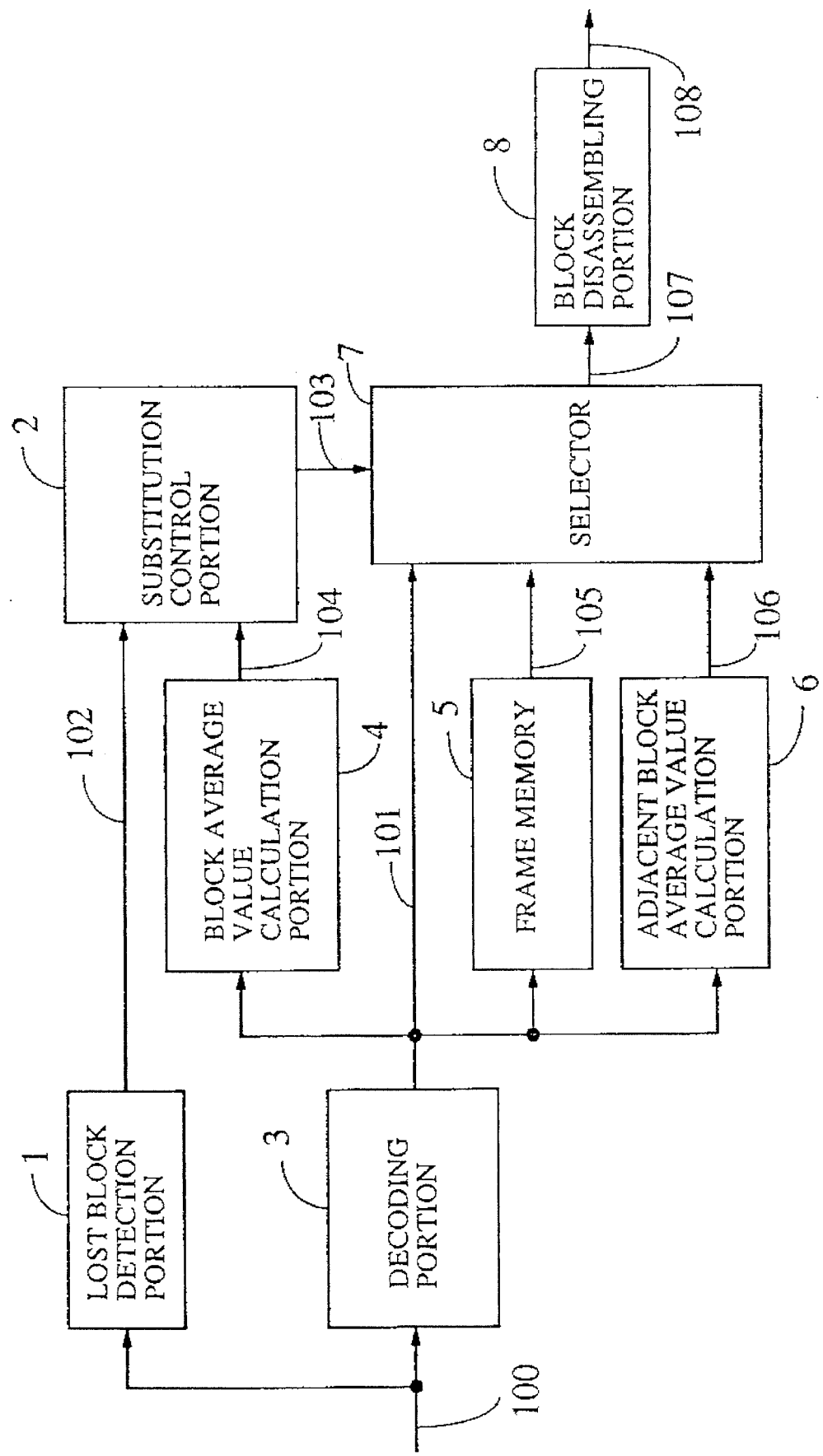
FIG. 1 is a block diagram of a moving picture receiving apparatus of an embodiment of the present invention.
Figure 3:
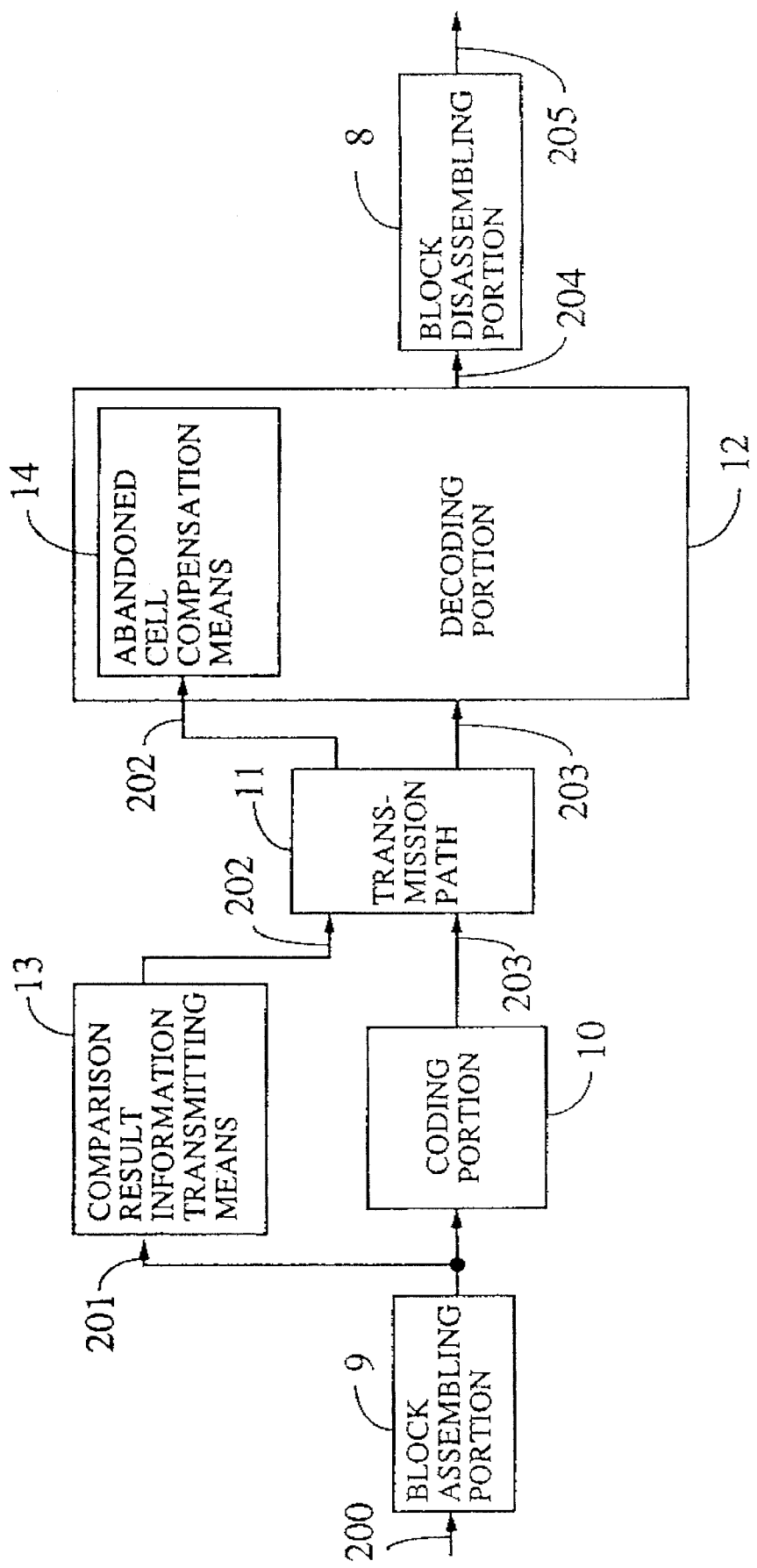
FIG. 3 shows a conventional principle construction of a picture data transmitting system.

FIG. 1 is a block diagram of a moving picture receiving apparatus of an embodiment of the present invention. In FIG. 1, 1 is a lost block detection portion, 2 is a substitution control portion, 3 is a decoding portion, 4 is a block average value calculation portion, 5 is a frame memory, 6 is an adjacent block average value calculation portion, 7 is a selector, and 8 is a block disassembling portion.

An operation of an embodiment of the present invention is explained here. The coded image signal 100 is generally decoded into image block data 101 in the decoding portion 3. The image block data 101 generally pass through the selector 7 and converted into linescan data, that is, output image data 108 of the block disassembling portion 8.

In case that the image data 100 are lost by errors or data abandonment through the transmission path 11, the position of the lost block is detected in the lost block detection portion 1 and the block position 102 of the lost image data are sent to the substitution control portion 2. A block average value calculation portion 4 calculates a block average value 104 from the image block data 101. A frame memory 5 provides image block 105 corresponding to the preceding frame. An adjacent block average value calculation portion 6 calculates an adjacent block average value 106 from the image block data 101.

The substitution control portion 2 detects a change of an average value of the block adjacent to the lost block by obtaining subtraction between an average value of a block adjacent to the lost block and an average value of the adjacent block at the same location corresponding to the preceding frame.

When there are many frame differences between the average values of the adjacent blocks and most of which are larger than the predetermined threshold value, that is, a changing value of the adjacent blocks is large, a selection signal 103 is outputted from the substitution control portion 2 so that the lost block is substituted by average value 106 obtained from the blocks adjacent to the lost block in the adjacent block average value calculation portion 6.

When there are few frame differences between the average values of the adjacent blocks and most of which are larger than the predetermined threshold value, that is, a changing value of the adjacent blocks is small, a selection signal 103 is outputted from the substitution control portion 2 so that the lost block is substituted by an output block 105 which is a block at the same location corresponding to the preceding frame.

As described above, the selector 7 selects either the average value 106 or the output block 105 instead of the lost block, the former average value 106 is obtained from the blocks adjacent to the lost block and is an output of the adjacent block average value calculation portion 6, the later output block 105 is a block at the same location corresponding to the preceding frame delayed by one frame through the frame memory 5, and outputs a signal 107. The block disassembling portion 8 disassembles the output signal 107 and outputs a moving picture signal 108.

FIG. 2 shows substitution patterns of the substitution control portion 2. FIG. 2A shows a state in which the changing average value of the blocks adjacent to the lost block at the center is substantially large in comparison with the threshold level. A center block is a lost block which can not be reproduced in the moving picture receiving apparatus. In the figures, the characters "large" or "small" indicates an average value difference between the current frame and the preceding frame. "large" means that the changing value is larger than the threshold level. "small" means that the changing value is smaller than the threshold level. In this case, the lost block at the center of the pattern is substituted by the average value of the peripheral blocks adjacent to the lost block.

FIG. 2B shows a state in which the changing average value of the blocks adjacent to the lost block at the center is substantially small in comparison with the threshold level. A center block is a lost block which can not be reproduced in the moving picture receiving apparatus. In the figures, the characters "large" or "small" indicates an average value difference between the current frame and the preceding frame. In this case, the lost block at the center of the pattern is substituted by the blocks at the same location corresponding to the preceding block.

In the above embodiment, the lost block is substituted by a block at the same location corresponding to the preceding frame. But, it may be substituted by a block at the same location corresponding to a preceding field in the case of an interlace signal.

In the above embodiment, the lost block is substituted by a block having the average value calculated from the adjacent blocks. But, in case that there are many signals most of which have substantially the same level as the direct current component level of the adjacent blocks, the lost block may be substituted directly by the direct current signal level without calculating the average value.

As described above, the embodiment of the present invention is applied to the receiving portion of the moving picture transmission apparatus. But it may be applied to a regeneration portion of the moving picture storage portion which is processed by block unit.

Those skilled in the art will recognize that many modifications to the foregoing description can be made without departing from the spirit of the invention. The foregoing description is intended to be exemplary and in no way limiting. The scope of the invention is defined in the appended claims and equivalents thereto.

What is claimed is:

1. A moving picture receiving method for substituting a lost block in a data stream within a moving picture receiving system, the data stream having frames, the frames including blocks, comprising the steps of:

detecting a lost block;

calculating an average value of blocks adjacent to the lost block to provide an adjacent block average value;

selecting one of the adjacent block average value and a value of a block having a corresponding location in a preceding frame in response to differences between average values of blocks adjacent to the lost block and average values of blocks in the preceding frame adjacent a block having a corresponding location to the lost block to provide a selected value; and substituting the selected value for the lost block.

2. A moving picture receiving method for substituting a lost block in a data stream within a moving picture receiving system, the data stream having frames, the frames having interlace signals in successive fields, the fields including blocks, comprising the steps of:

detecting a lost block;

calculating an average value of blocks adjacent to the lost block to provide an adjacent block average value; and selecting one of the adjacent block average value and a value of a block from a preceding field corresponding to the lost block in response to differences between average values of blocks adjacent to the lost block and average values of blocks in the preceding field adjacent a block having a corresponding location to the lost block to provide a selected value; and substituting the selected value for the lost block.

3. A moving picture receiving apparatus for receiving a coded image signal representing a moving picture, and for substituting a lost block, the coded image signal having frames, the frames including blocks, comprising:

lost block detection means for receiving the coded image signal and for providing a lost block position signal;

block average value calculation means for receiving an image block data signal and for providing a block average value signal for each block;

substitution control means, having a first input connected to receive the lost block position signal and a second input connected to receive the block average value signal, for detecting a change of average values of blocks adjacent to the lost block by performing a comparison between first calculated average values for blocks adjacent to the lost block and corresponding second calculated average values for blocks in the preceding frame adjacent to a position corresponding to the lost block position in a present frame, and for providing a control signal;

frame memory means for receiving image block data and for providing an image block average value signal associated with a corresponding preceding frame;

adjacent block average value calculation means for receiving image block data and for providing an adjacent block average value signal; and selector means, having a first input connected to receive the control signal, a second input connected to receive the image block average value signal and a third input connected to receive the adjacent block average value signal, for selecting a block value selected from at least one of the image block average value signal and the adjacent block average value signal according to the output control signal from the substitution control means.

4. A moving picture receiving apparatus according to claim 3, further comprising:

decoding means for decoding a coded image signal to produce an image block data signal, the decoding means having an output connected to an input of the block average value calculation means, an input of the frame memory means, and an input of the adjacent block average value calculation means; and a block disassembling means for receiving and disassembling an output signal from the selector means and for outputting a moving picture signal.

5. A moving picture receiving apparatus for receiving a coded image signal with interlace representing a moving picture, and for substituting a lost block, the coded image signal having frames, the frames having interlace signals in adjacent fields, the fields including blocks, comprising:

lost block detection means for receiving the coded image signal and for providing a lost block position signal;

block average value calculation means for receiving an image block data signal and for providing a block average value signal for each block;

substitution control means, having a first input connected to receive the lost block position signal and a second input connected to receive the block average value signal, for detecting a change of average values of blocks adjacent to the lost block by performing a comparison between first calculated average values for blocks adjacent to the lost block and corresponding second calculated average values for blocks in the preceding field adjacent to a position corresponding to the lost block position in a present field, and for providing a control signal;

field memory means for receiving image block data and for providing an image block average value signal associated with a corresponding preceding field;

adjacent block average value calculation means for receiving image block data and for providing an adjacent block average value signal; and selector means, having a first input connected to receive the control signal, a second input connected to receive the image block average value signal and a third input connected to receive the adjacent block average value signal, for selecting a block value selected from at least one of the image block average value signal and an adjacent block average value according to the output control signal from the substitution control means.

6. A method for substituting a lost block in a data stream within a moving picture receiving system, the data stream having frames, the frames including blocks, comprising steps of:

detecting a lost block;

calculating an average value of blocks adjacent to the lost block to provide an adjacent block average value;

calculating average value differences between an average value of each block adjacent to the lost block and an average value of each block in a preceding frame adjacent to a block having a corresponding location to the lost block to provide block average value differences;

substituting for the lost block the adjacent block average value if more than a predetermined number of the block average value differences exceed a predetermined value; and substituting for the lost block a block having a corresponding location in a preceding frame if less than a predetermined number of the block average value differences exceed a predetermined value.

7. A method for substituting a lost block in a data stream within a moving picture receiving system, the data stream having frames, the frames having interlace signals in successive fields, comprising steps of:

detecting a lost block;

calculating an average value of blocks adjacent to the lost block to provide an adjacent block average value;

calculating average value differences between an average value of each block adjacent to the lost block and an average value of each block in a preceding field adjacent to a block having a corresponding location to the lost block to provide block average value differences;

substituting for the lost block the adjacent block average value if more than a predetermined number of the block average value differences exceed a predetermined value; and substituting for the lost block a block having a corresponding location in a preceding field if less than a predetermined number of the block average value differences exceed a predetermined value.

8. A method for substituting a lost block in a data stream within a moving picture receiving system, the data stream having frames, the frames including blocks, comprising steps of:

detecting a lost block;

calculating an average value of blocks adjacent to the lost block to provide an adjacent block average value;

determining whether the values of several adjacent blocks are substantially equal to the values of blocks in corresponding locations in a preceding frame;

substituting for the lost block the value of an adjacent block if the values of several adjacent blocks are substantially equal; and substituting for the lost block the adjacent block average value if the values of several adjacent blocks are not substantially equal.

9. A moving picture receiving apparatus for receiving a coded image signal representing a moving picture, and for substituting a lost block, the coded image signal having frames, the frames including blocks, comprising:

a lost block detector having an input through which a coded image signal is received and having a output which provides a signal indicative of a lost block position;

a block average value calculator having an input through which an image block data signal is received and having an output which provides a signal indicative of a block average value;

a substitution controller, having a first input connected to the output of the lost block detector, a second input connected to the output of the block average value calculator, and an output which provides a control signal indicative of a source of a desired substitute block value as determined by a comparison between first calculated average values of blocks adjacent to the lost block and corresponding second calculated average values of blocks in the preceding frame adjacent to a position corresponding to the lost block position in the present frame;

a frame memory having an input through which image block data is received and having an output which provides an image block average value signal associated with a corresponding preceding frame;

an adjacent block average value calculator having an input through which image block data signals are received and an output which provides an adjacent block average value signal; and a selector, having a first input connected to the output of the substitution controller, a second input connected to the output of the block average value calculator, and a third input connected to the output of the adjacent block average value calculator, responsive to the control signal to output one of the value received through the first input and the value received through the second input.

10. A moving picture receiving apparatus according to claim 9, further comprising:

a decoder having an input through which a coded image signal is received and an output which provides an image block data signal, the output of the decoder connected to an input of the block average value calculator, an input of the frame memory, and an input of the adjacent block average value calculator; and a block disassembler having an output which provides a moving picture signal.

11. A moving picture receiving apparatus for receiving a coded image signal representing a moving picture, and for substituting a lost block, the coded image signal having frames, the frames having interlace signals in successive fields, the fields including blocks, comprising:

a lost block detector having an input through which a coded image signal is received and having a output which provides a signal indicative of a lost block position;

a block average value calculator having an input through which an image block data signal is received and having an output which provides a signal indicative of a block average value for each block;

a substitution controller, having a first input connected to the output of the lost block detector, a second input connected to the output of the block average value calculator, and an output which provides a control signal indicative of a source of a desired substitute block value as determined by a comparison between first calculated average values of blocks adjacent to the lost block and corresponding second calculated average values of blocks in the preceding field adjacent to a position corresponding to the lost block position in the present field;

a field memory having an input through which image block data is received and having an output which provides an image block average value signal associated with a corresponding preceding field;

an adjacent block average value calculator having an input through which image block data signals are received and an output which provides an adjacent block average value signal; and a selector having a first input connected to the output of the substitution controller, a second input connected to the output of the block average value calculator, and a third input connected to the output of the adjacent block average value calculator.

12. A moving picture receiving apparatus for receiving a coded image signal representing a moving picture, and for substituting a lost block, the coded image signal having frames, the frames including blocks, comprising:

a lost block detector having an input through which a coded image signal is received and having a output which provides a signal indicative of a lost block position;

a block average value calculator having an input through which an image block data signal is received and having an output which provides a signal indicative of a block average value for each block;

a substitution controller, having a first input connected to the output of the lost block detector, a second input connected to the output of the block average value calculator, and an output which provides a control signal indicative of a source of a desired substitute block value as determined by a comparison between first calculated average values of blocks adjacent to the lost block and corresponding second calculated average values of blocks in the preceding frame adjacent to a position corresponding to the lost block position in the present frame;

a frame memory having an input through which image block data is received and having an output which provides an image block average value signal associated with a corresponding preceding frame; and a selector having a first input connected to the output of the substitution controller, a second input connected to the output of the block average value calculator, and means for selecting a single image block data value corresponding to a single block adjacent to the lost block when several image block data values of adjacent blocks are substantially the same.

\* \* \* \* \*